(12) United States Patent
Schmutz

(10) Patent No.: US 6,477,388 B1
(45) Date of Patent: Nov. 5, 2002

(54) BROADBAND POWER MANAGEMENT (POWER BANKING) WITHIN A BROADBAND MULTI-CARRIER BASE STATION TRANSCEIVER SYSTEM

(75) Inventor: Thomas R. Schmutz, Indialantic, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/363,846

(22) Filed: Jul. 30, 1999

Related U.S. Application Data
(60) Provisional application No. 60/094,658, filed on Jul. 30, 1998.

(51) Int. Cl.[7] .................................................. H04Q 7/20
(52) U.S. Cl. ........................ 455/522; 455/561; 455/127
(58) Field of Search ................................. 455/522, 127, 455/450, 451, 452, 62, 561, 560

(56) References Cited

U.S. PATENT DOCUMENTS

| | | | |
|---|---|---|---|
| 4,777,653 A | | 10/1988 | Bonnerot et al. ............. 455/69 |
| 5,485,486 A | | 1/1996 | Gilhousen et al. |
| 5,504,939 A | * | 4/1996 | Mayrand et al. |
| 5,832,387 A | | 11/1998 | Bae et al. .................... 455/522 |
| 6,061,568 A | * | 5/2000 | Dent ............................ 455/62 |
| 6,236,864 B1 | * | 5/2001 | McGowan et al. ......... 455/522 |

* cited by examiner

*Primary Examiner*—Nguyen T. Vo
(74) *Attorney, Agent, or Firm*—Akerman Senterfitt

(57) ABSTRACT

A method and apparatus to manage RF power in a broadband transceiver station (BTS) that includes a multi-carrier common RF power source such as a multi-carrier power amplifier (MCPA), for maintaining carrier power at a prescribed level. The power is managed by a power banking agent which is a module of the BTS system software. On a new channel request, the power banking agent determines if the request can be satisfied at the requested level. Otherwise, the power banking agent determines if the channel request can be satisfied at a lower power level. The power banking agent also manages active channels by reclaiming power from channels requiring less power and/or by allocating more power to the channels requiring more power. If the power banking agent cannot satisfy a request, the power banking agent will queue the request until a later time in the event that additional power becomes available. The power banking agent also processes alarms which can occur in the event of a MCPA module addition or MCPA module failure.

19 Claims, 13 Drawing Sheets

BROADBAND POWER MANAGEMENT (POWER BANKING) WITHIN A BROADBAND MULTI-CARRIER BASE STATION TRANSCEIVER SYSTEM

This application is related to and claims priority from U.S. Provisional Application No. 60/094,658 entitled "BROADBAND POWER MANAGEMENT (POWER BANKING) WITHIN A BROADBAND MULTI-CARRIER BASE STATION TRANSCEIVER SYSTEM" filed Jul. 30, 1998, the entirety of which is incorporated herein by reference.

BACKGROUND OF THE INVENTION

1. Field of the Invention

This invention relates generally to a power management system in a base station transceiver system. In particular, the present invention allocates power to channels on a demand-based system for the base station transceiver system.

2. Background of the Invention

A conventional cellular phone system 1300 is shown in FIG. 1. As illustrated in FIG. 13, the cellular phone system 1300 includes a plurality of cells 1310a, 1310b, a mobile unit 1320, a plurality of base transceiver stations (BTS) 1305a, 1305b, communication lines 1340, a mobile telecommunications switching office (MTSO) 1330, an interface 1350 and a switched telephone network 1360.

The cellular phone system 1300 has a fixed number of channel sets distributed among the BTS 1305a, 1305b serving a plurality of cells 1310a, 1310b arranged in a predetermined reusable pattern. The mobile unit 1320, in a cell 1310a or 1310b, communicates with the BTS, 1305a or 1305b, respectively, via radio frequency (RF) means. The BTS 1305a, 1305b communicate with the MTSO 1330 via communication lines 1340. The MTSO 1330 communicates with the switched telephone network 1360 via the interface 1350.

In the cellular phone system 1300, the cell areas typically range from 1 to 300 square miles. The larger cells typically cover rural areas, and the smaller cells typically cover urban areas. Cell antenna sites utilizing the same channel sets are spaced by a sufficient distance to assure that co-channel interference is held to an acceptably low level.

The mobile unit 1320 in a cell 1310a has radio telephone transceiver equipment which communicates with similar equipment in BTS 1305a, 1305b as the mobile unit 1320 moves from cell to cell.

Each BTS 1305a, 1305b relays telephone signals between mobile units 1320 and a mobile telecommunications switching office (MTSO) 1330 by way of the communication lines 1340.

The communication lines 1340 between a cell site, 1310a or 1310b, and the MTSO 1330, are typically T1 lines. The T1 lines carry separate voice grade circuits for each radio channel equipped at the cell site, and data circuits for switching and other control functions.

The MTSO 1330 in FIG. 1 includes a switching network (not shown) for establishing call connections between the public switched telephone network 1360 and mobile units 1320 located in cell sites 1310a, 1310b and for switching call connections from one cell site to another. In addition, the MTSO 1330 includes a dual access feeder (not shown) for use in switching a call connection from one cell site to another. Various handoff criteria are known in the art and utilize features such as phase ranging to indicate the distance of a mobile unit from a receiving cell site, triangulation, and received signal strength to indicate the potential desirability of a handoff. Also included in the MTSO 1330 is a central processing unit (not shown) for processing data received from the cell sites and supervisory signals obtained from the switched telephone network 1360 to control the operation of setting up and taking down call connections.

In order to remain competitive in an increasingly crowded market, wireless equipment manufacturers experience constant pressure to reduce their costs. One way to reduce the overall cost of a cellular phone system is to re-design individual system components to operate at a lower cost.

In the conventional cellular phone system, the power amplifier used in a BTS is a significant factor contributor to the overall cost of the BTS. As one of the most expensive components, it would be desirable to have the power amplifier operate as efficiently as possible in terms of power usage, in order to minimize the hardware requirements for this high cost component.

In a typical broadband Base Transceiver System that supports multiple conversations with mobile stations on different frequencies, each carrier signal must be amplified separately. It is possible to provide a single power amplifier for each carrier, along with a frequency selective combiner. This architecture suffers significant loss of efficiency due to the insertion losses encountered in the frequency combiner. Perhaps more significantly, the frequency combiner is physically large, with and typically has "static" frequency selectivity which needs to be manually tuned during base station installation and reconfiguration. The efficiency of a single carrier power amplifier installation can be improved through the installation of antenna combiners, an architecture that generally requires mast mounted power amplifiers, which increases the required geographic area for the base station installation. The arrangement of small power amplifiers in an array, using spatial combination of a number of antenna elements instead of one central power amplifier per antenna, improves the physical space requirements of the system, but it still requires multiple antenna installations, and accordingly requires a relatively large physical space in which to locate the installation.

The installation of a single, high-power multi-carrier power amplifier (MCPA) will overcome these drawbacks of the single carrier power amplifier installation. However, a common limitation of the multi-carrier amplifier is linearity—that is, the typical MCPA provides a fixed amount of power for each carrier in the BTS in a technique known as the "divide among carriers" scheme.

This fixed division of power has some drawbacks. For instance, a fixed amount of power for each carrier necessarily limits the distance that the broadband BTS can transmit. When a carrier wave is initially transmitted, the strength of the carrier wave is close to the fixed amount of power assigned to that carrier. As the carrier wave propagates through space, the power decreases, varying inversely proportionally to the transmission distance R raised to the fourth power, i.e.

$$\text{Power} \propto \frac{1}{R^4}$$

Since mobile subscribers cannot detect signals below a minimum threshold level of transmitted power, capping the transmit power of each carrier wave limits how far that carrier wave can travel. Thus, fixing the amount of transmit power limits the cell size that the BTS can serve.

Another drawback of the "divide among carriers scheme" is that it uses the overall power allocated to the BTS inefficiently. The power allocated to the unused carriers is wasted when fewer than all of the carriers are in use.

In the event of failure of a power amplifier module in a MCPA, the "divide among carriers" scheme is incapable of compensating for the failure. Typically, the BTS MCPA has several MCPA modules. If one or more of the MCPA modules fails, there is typically not a way for the remaining modules to compensate for the loss of the failed power amplifier modules. Since in that situation there are less power amplifier modules available for the same number of carriers, the actual power supplied to each carrier is less than the power set for the carrier. This reduction in power to each carrier results in an associated reduction in distance that the carrier propagates, and thus the cell site coverage is reduced.

Similarly, the "divide among carriers" scheme does not automatically compensate when additional MCPA modules are installed in the BTS. Since in the "divide among carriers" scheme the amount of power for each carrier has already been set, the installation of additional power supply units does not automatically increase the power per carrier without significant reprogramming of the BTS.

Furthermore, because an MCPA is typically one of the most expensive components of a BTS, it is desirable to deliver a power supply with the minimum number of MCPA modules while retaining the ability to provide maximum transmit power. Minimizing the size of the power amplifier may lower the cost of the power amplifier, which in turn lowers the overall cost of the BTS.

Accordingly, there is a need for a multicarrier power amplifier that can deliver maximum transmit power using the minimum necessary power amplifier. Furthermore, there is need for a multicarrier power amplifier that can automatically compensate for a MCPA module failure and/or the addition of a MCPA module.

SUMMARY OF THE INVENTION

An object of the present invention is to provide a method for dynamically allocating radio frequency power to all carriers served by a single BTS.

Another object of the present invention is to provide a method for maximizing coverage area of a BTS by dynamically allocating RF power to each carrier.

It is yet another object of the present invention to prevent saturation and failure of a MCPA, by recognizing the strength of each input signal to the MCPA, and adjusting the gain dynamically to produce maximum output RF power for each carrier.

Another object of the present invention is to provide a system wherein a MCPA can compensate automatically for the failure of individual MCPA modules. It is a further object of the present invention to provide a system whereby a MCPA can compensate automatically for the installation of additional power supply modules.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention achieves the aforementioned desired objects by providing a power banking method and apparatus comprising a modular power banking agent for the dynamic distribution of RF power from a source power amplifier to a plurality of power sinks. In particular, the present invention provides the source power amplifier with the ability to determine whether or not it can allocate RF power to a new power sink, as well as the ability to modify a previously established allocation of RF power to a power sink. The present invention also provides for re-allocation of RF power in the event that additional supply power amplifier capacity is installed in the source power amplifier or in the event that the source power amplifier suffers a loss of power amplifier capacity.

Another embodiment of the present invention provides for the intelligent allocation of power from multicarrier power amplifier modules in a broadband base transceiver station (BTS). The BTS has a module in the controller software which monitors the available power. In monitoring the available power, the module has the ability to allocate new channels, reclaim power from unused channels and to process alarms regarding the power supply modules.

Figure 1:
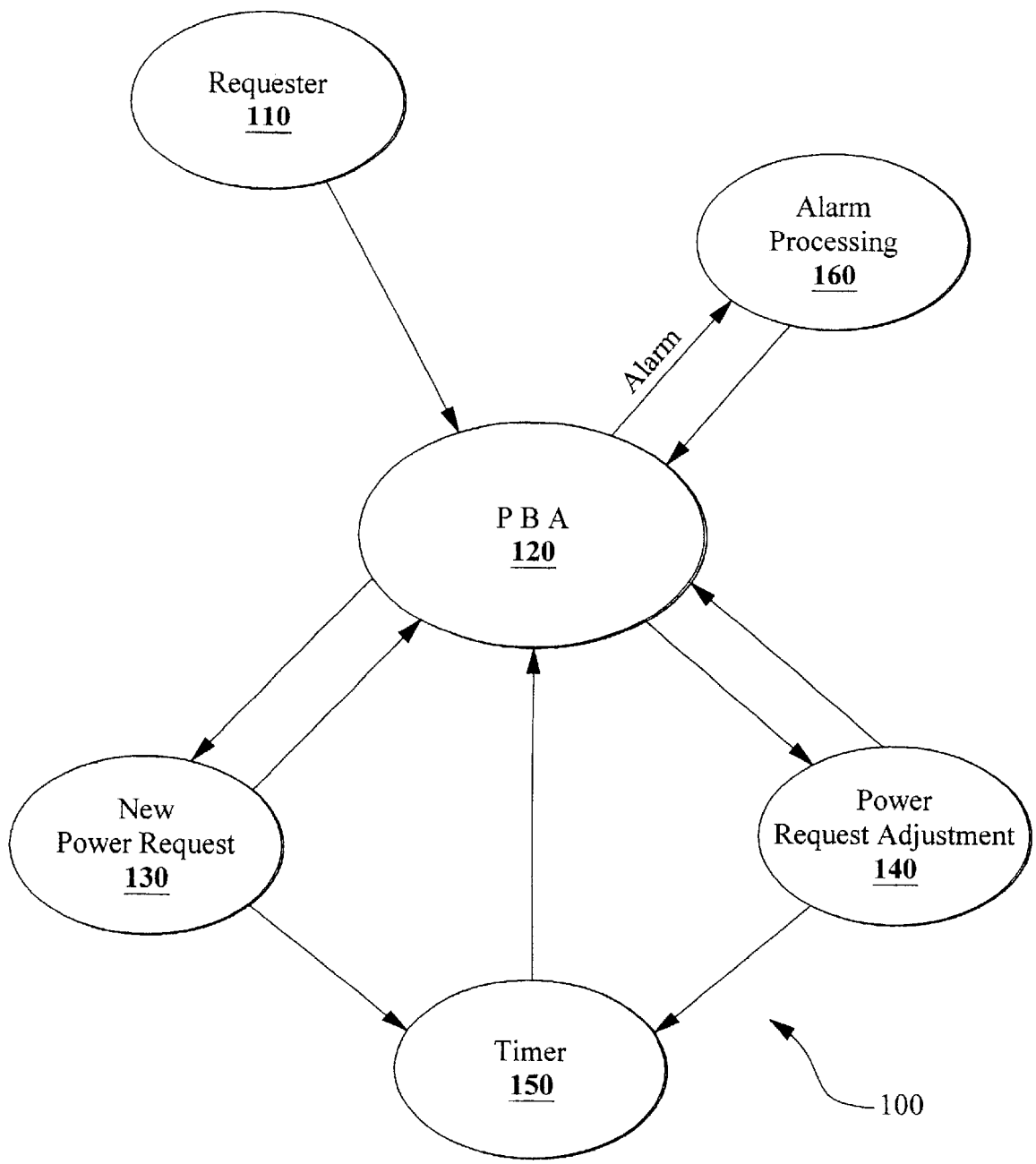
FIG. 1 illustrates an embodiment of the power banking agent in a generic machine application, in accordance with the principles of the present invention.

FIG. 1 illustrates a software state machine showing the functions affected by a power banking module 100.

In the embodiment of FIG. 1, the power banking module 100 includes a power banking agent (PBA) module 120, a new power request module 130, a power adjustment request module 140, a timer module 150, and an alarm processing module 160.

The PBA module 120 provides a way for the power banking module 100 to classify incoming requests and/or alarms. The PBA module 120 also maintains a matrix or database of various information such as the power sinks and the allocated power to the power sinks and the available power.

The new power request module 130 provides a way to determine if a power sink may be granted power. A new power request is typically made when there is a new power sink that requires a power source i.e. a new channel or a new installed device that requests power for transmission or operation, respectively.

The power adjustment request module 140 provides a way to grant more power to the power sinks when needed, or reclaim power from the power sinks if the power is not needed.

The timer module 150 provides a way for requests for power to be placed in a queue to be resubmitted later. In this manner, power may be granted to a power sink at a later time if the demand for power has lessened.

The alarm processing module 160 provides a way for the power banking module 100 to react to an alarm situation such as a power supply failure and/or power supply addition.

In operation, the PBA module 120 receives a request from a Requester 110. The Requester may be any type of device that requires power.

The PBA module 120 analyzes the request from a Requester to determine what action to take next. If the request is a new power request, the PBA module 120 forwards the request to the new power request module 130. The new power request module 130 determines if the power banking module 100 has the available resources to satisfy the new power request.

However, if the new power request cannot be satisfied, the PBA module 120 forwards the request to the timer module 150. The timer module 150 places the new power request on a queue. After the time in the queue has elapsed, the PBA module 120 resubmits the new power request.

If the PBA module 120 determines that the request is for a power adjustment, the PBA module 120 forwards the power adjustment request to the power adjustment module 140. A power adjustment request may come from a power sink requesting additional power and/or requesting a power reduction.

If a power adjustment request is requesting additional power which cannot be satisfied immediately, the PBA module 120 forwards the power adjustment request to the timer module 150. The timer module 150 places the power adjustment request on a queue. After the time in the queue has elapsed, the PBA module 120 resubmits the power adjustment request for additional power.

If the PBA module 120 determines that the request is an alarm such as power source failure or the installation of a new power source, the PBA module 120 forwards the alarm to the alarm processing module 150.

Figure 2:
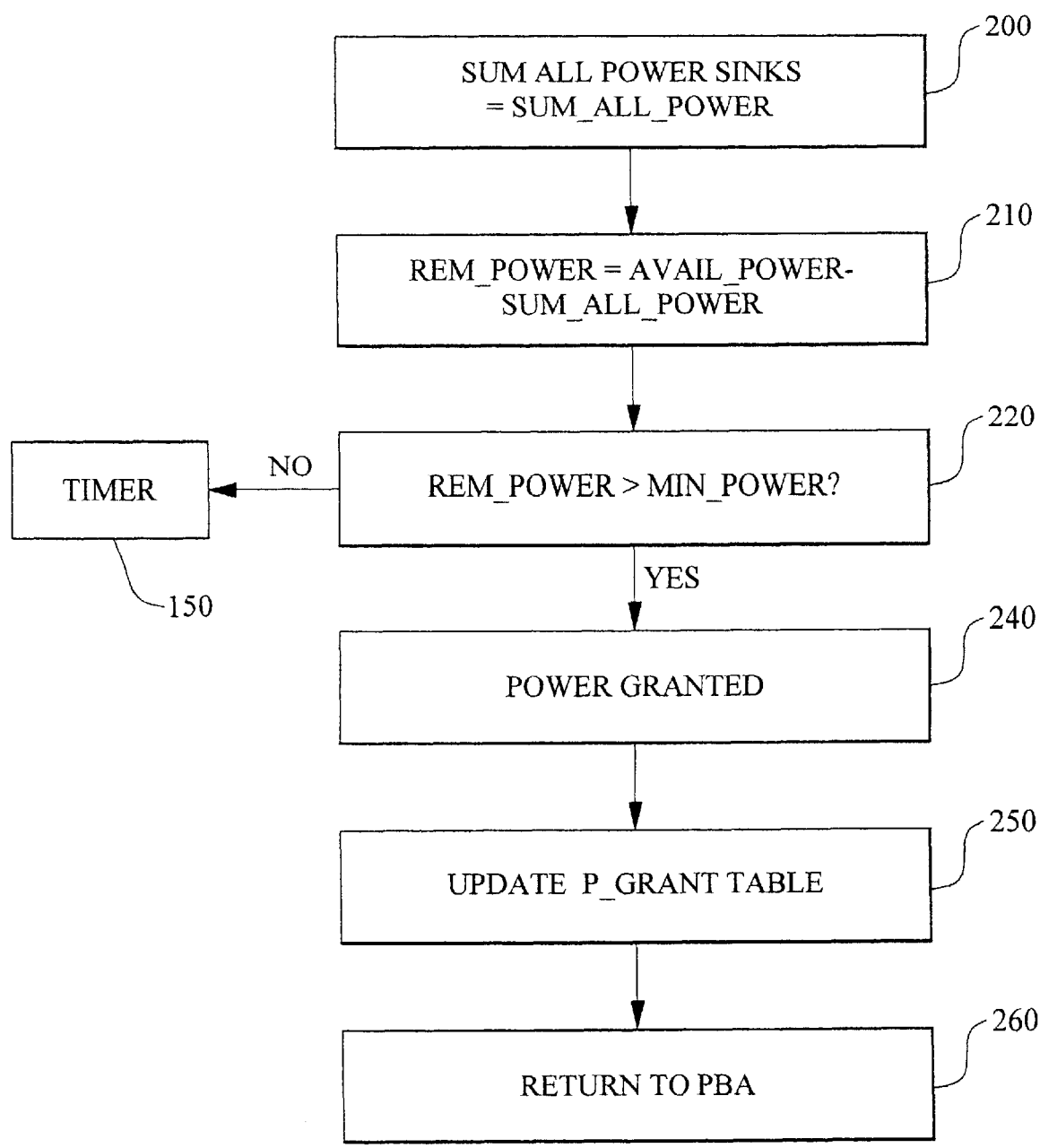
FIG. 2 illustrates a flow diagram of the new power request module of the embodiment of the power banking agent in FIG. 1.

When a request is determined by the PBA module 120 to be a new power request, FIG. 2 is a flow diagram of a process implemented by the new power request module 130 associated with the state machine of FIG. 1 according to the principles of the present invention.

During initialization of the power banking module 100, the PBA 120 creates a database or a data table maintaining information about which power sinks are active, the allocated power to the power sinks, and an available power, Avail_Power.

In order to ensure that the new power request can be satisfied, the new power request module 130 of the present invention needs to determine if it has the available power resources to satisfy the request. The new power request module 130 initially calculates a Sum_All_Power. Sum_All_Power is the sum of the instantaneous power demanded by all of the active power sinks for the given time interval, in step 200.

In step 210, the new power request module 130 determines Rem_Power by subtracting Sum_All_Power from Avail_Power. Avail_Power represents a value of the available power that could be supplied prior to any distribution of power to the power sinks. In the preferred embodiment of the present invention, Avail_Power comprises the total power output of all MCPA modules. However, in an actual system, the total power output would have to be minus any power losses due to other components or interconnections.

In step 220, the new power request module 130 compares Rem_Power to Min_Power. Min_Power represents that amount of power which provides a safety margin to ensure that the power sources managed by the PBA 120 module are not strained. If the Rem_Power is less than Min_Power, the request is forwarded to the timer module 150 of FIG. 1. The timer module 150 queues the request for resubmission after the expiration of a certain length of time. Thus, the new power request may be fulfilled at a later time when sufficient power may become available. After forwarding the signal to the timer module 150, the new power request module 130 executes step 260, returning processing to the PBA module 120.

Returning to step 220, if the new power request module 130 concludes that Rem_Power is greater than Min_Power, then the new power request module 130 grants a quantity of power designated P_Grant to the new power sink in step 240. A new entry in the data table is made for the new power sink granted power in step 240. The entry includes identification of which power sink and the amount of power is being allocated in the P_Grant.

In the preferred embodiment of the new power request module 130 of the present invention, all power sinks are allocated power in increments of a user-defined value P_Grant. In step 250, the new power request module 130 employs the quantity P_Grant, which represents a fixed incremental value of power which can be granted to and drawn by a power sink. In step 250, the new power request module 130 enters a value of P_Grant in the corresponding power consumption table.

By granting new power requests in increments of P_Grant, the new power request module 130 allocates power to the requesting power sinks in controllable amounts, which allows the power sinks to determine whether they need additional power, without risking saturation of the power source.

In step 260, the new power request module 130 returns processing to the PBA module 120.

Figure 3:
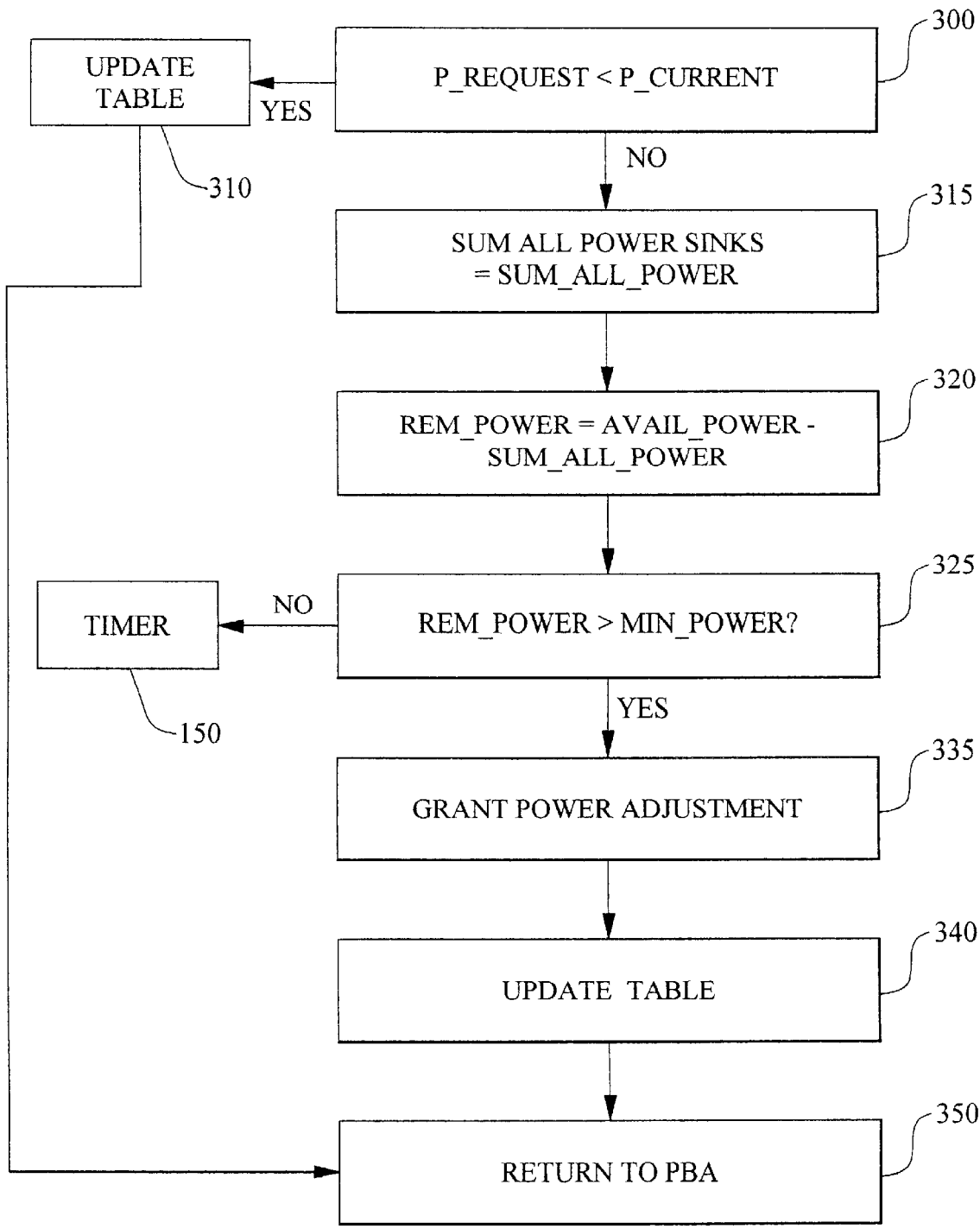
FIG. 3 illustrates a flow diagram of the power adjustment request module of the embodiment of the power banking agent in FIG. 1.

When the PBA module 120 determines that an incoming request is for a power adjustment, the PBA module 120 forwards the signal to the power adjustment request module 140 illustrated in FIG. 3.

FIG. 3 is a flow diagram of a process implemented by the power adjustment request module 140 associated with the state machine of FIG. 1 according to the principles of the present invention.

A power sink will request a power adjustment typically occurs in two situations. In the first circumstance, the power sink requires additional power, and in the second circumstance the power sink has too much power. To identify each of the two distinct situations, in step 300 the power adjustment request module compares the power requested, designated P_Request, to the current power consumption, P_Current.

If P_Request is less than P_Current, the power adjustment request module updates the data matrix of power sinks and the corresponding entry of power consumption by the power sink requesting adjustment. The value of P_Current for the particular power sink is overwritten by value of P_Request in step 310. After updating the data matrix of power consumption data in step 310, the power adjustment module executes step 350, returning processing to the PBA 100.

Returning to step 300, if the quantity P_Request is greater than P_Current, this means that the power sink is requesting more power than it is consuming at the time of the request. In order to ensure that there is sufficient power available to supply the requested power, it is necessary to determine the quantity remaining power, designated Rem_Power. Rem_Power is calculated from the available power, designated Avail_Power, and an instantaneous sum of the power drawn by the power sinks at the time of the request, designated Sum_All_Power.

In step 315, Sum_All_Power is calculated by summing the instantaneous power allocation for all of the power sinks. One method of achieving this is by summing all the corresponding entries in the power consumption matrix, which tracks the allocation of power to all of the power sinks.

In step 320, Rem_Power is calculated by subtracting the quantity Sum_All_Power from Avail_Power. As described with respect to step 210, Avail_Power is a fixed quantity representing the power provided by the power source. The value Avail_Power is stored, and represents the value of the available power that could be supplied prior to any distribution of power to the power sinks, less any losses from intermediate devices such as filters, power conditioners, and connectors.

In step 325, the quantity Rem_Power is compared to the quantity Min_Power. Min_Power represents that amount of power which provides a safety margin sufficient to ensure that the power sources managed by the PBA module 120 are not strained. If the Rem_Power is less than Min_Power, the power adjustment is forwarded to the timer module 150 and the power adjustment module 140 exits.

Returning to the comparison of step 325, if Rem_Power is greater than Min_Power, the power adjustment request module 140 grants the power adjustment in step 335.

In step 340, the matrix or table that tracks each power sink and its corresponding power consumption is updated. The specific power sink that requested the additional power is indexed and the corresponding current power consumption entry is overwritten by the requested power quantity, P_Request.

Finally, in step 350, the power adjustment module 140 returns processing to the PBA module 120.

Figure 4:
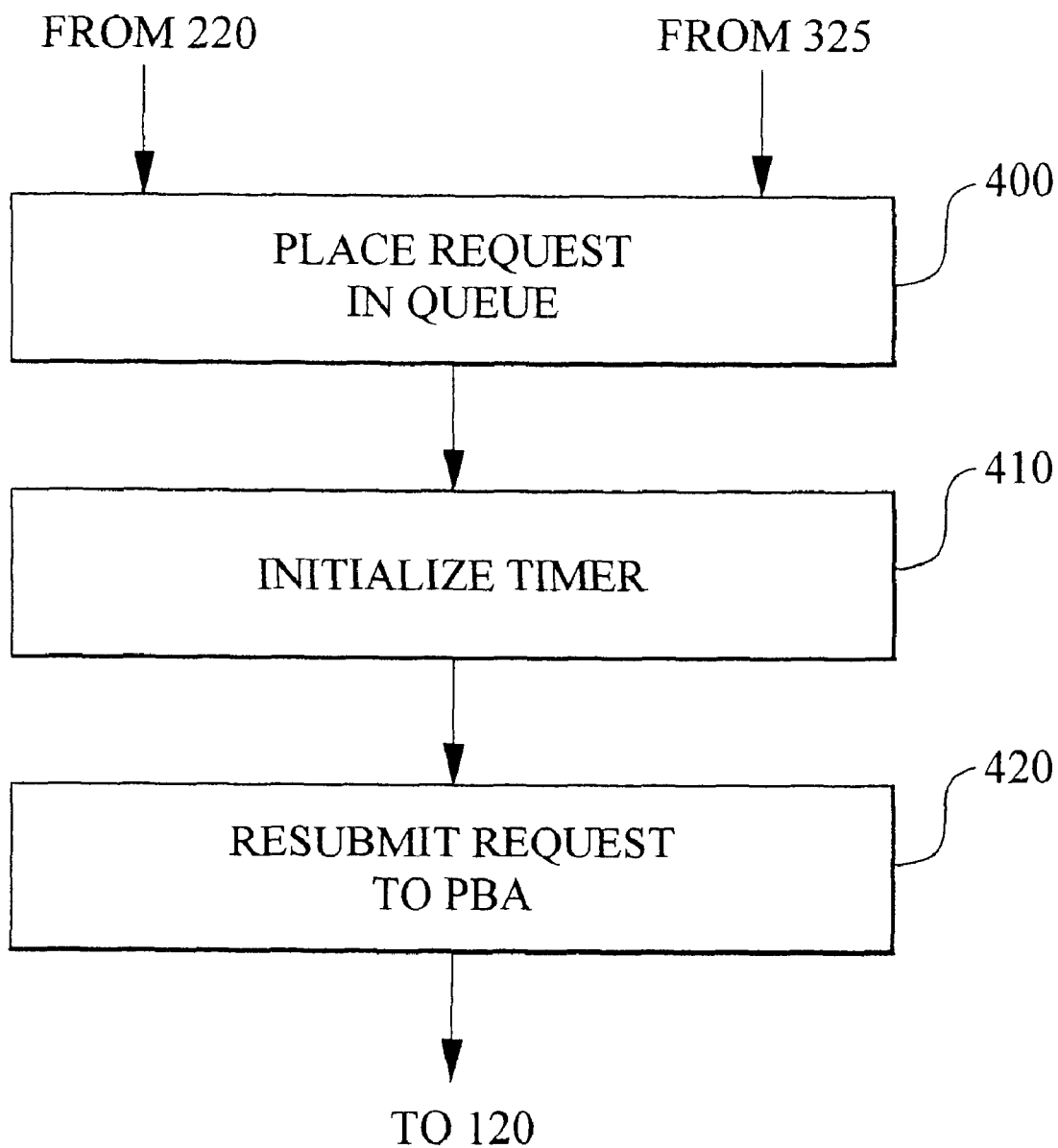
FIG. 4 illustrates a flow diagram of the timer module of the embodiment of the power banking agent in FIG. 1.

FIG. 4 illustrates a flow diagram of the timer module 150 of the power banking module 100 of FIG. 1 according to the principles of the present invention.

One of the novel aspects of the present invention is the feature that when a request is denied, it can be resubmitted subsequently, and if conditions permit upon resubmission, the request can be satisfied. Because the present invention permits the recovery of power from idle or partially-powered power sinks, it is possible for a denied request to be satisfied at a later point in time. One embodiment of this aspect is illustrated in FIG. 4.

After a request for a new channel is denied in step 220 or an power adjustment request for additional power is denied in step 325, the denied request is placed in a queue in step 400.

In step 410, a timer is initialized and the request is queued for resubmission at the expiration of the timer interval.

As the timer interval expires, step 420, the request is forwarded again to the PBA module 120 to be processed again and the timer module 150 returns processing to the PBA module 120.

Another aspect of the present invention is the ability of the invention to adapt to the installation of additional of power sources or to the failure of power sources.

Figure 5:
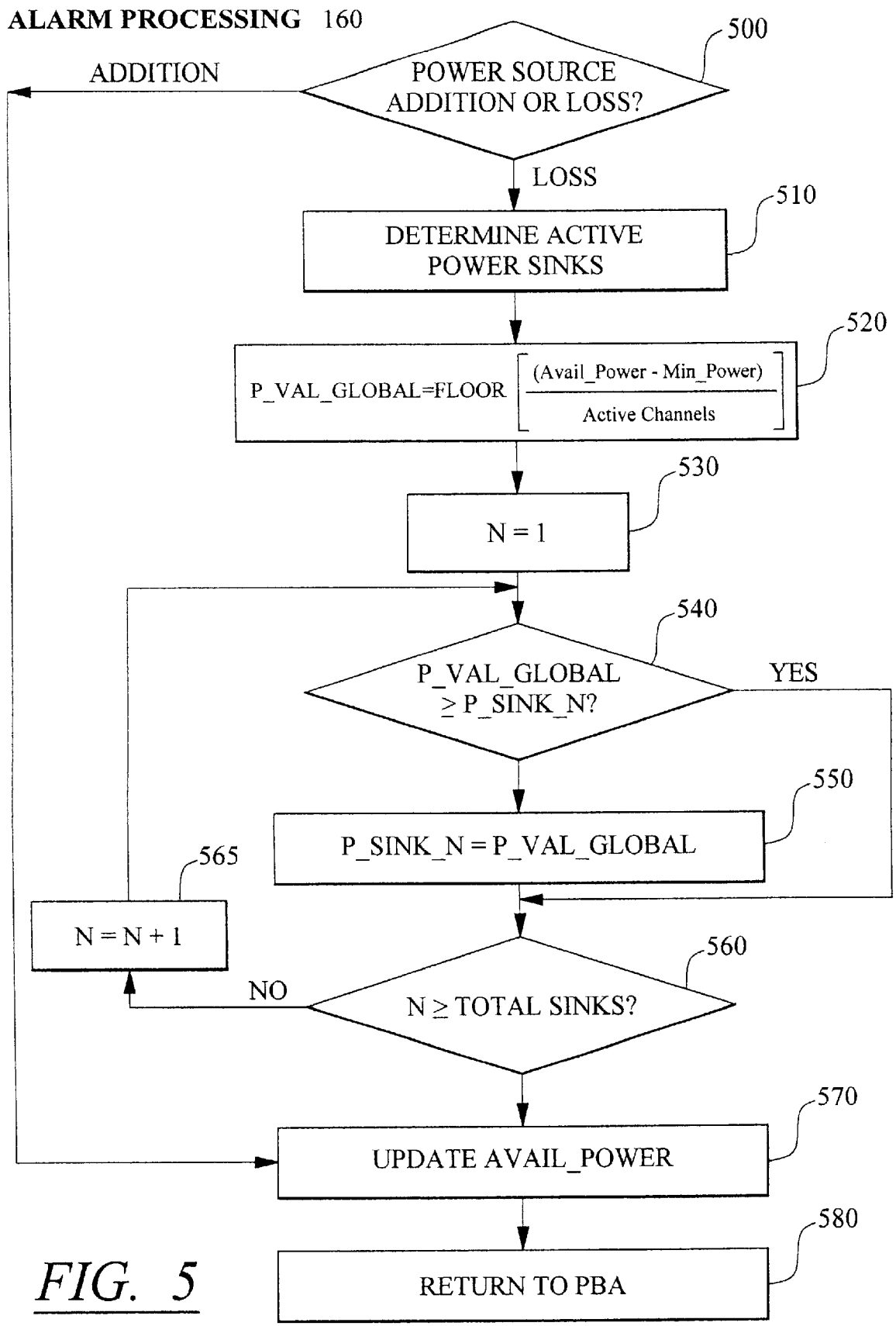
FIG. 5 illustrates a flow diagram of the alarm processing module of the embodiment of the power banking agent in FIG. 1.

FIG. 5 illustrates a flow diagram of the alarm processing module 160 of the embodiment of the power banking module 100 in FIG. 1.

In this embodiment of the present invention, the PBA module 120 is interfaced with an alarm processing system (not shown) of the overall system. The alarm processing module 160 functions to determine whether or not an error, failure, or other reportable event has occurred within the system. The alarm processing module 160 processes alerts from the various hardware and software associated with the overall system. In this instance, the PBA module 120 are forwarded the alerts concerning power sources being added and power source failures.

Once an alert has been received by the PBA module 120, the PBA module 120 enters an alarm processing module 160 as illustrated in FIG. 5. In step 500, the alarm processing module determines whether or not the alert is notifying the PBA module 120 that an additional power source has been added or a power source has been eliminated.

If from step 500, it is determined that the alert is the notification of a power source being added, the quantity Avail_Power is increased in step 570 by the amount of power in the additional power source. Avail_Power is a global variable which is used by other modules of the PBA module 120 in the processing of power requests, such as in step 210 of the new power request module 130 of FIG. 2, and in step 320 of the power adjustment request module 140. Avail_Power represents the total amount of power provided by all available power sources. The alert can be programmed to carry information such as power source type, amount of available power, and other relevant data.

Once the quantity Avail_Power has been updated to reflect the additional power source, the alert processing module 160 returns processing to the PBA module 120 in step 580.

Returning to step 500, since loss of a power source could strain the remaining power sources, the present invention in the current embodiment accounts for a possible loss of a power source by reducing the power allocations of the power sinks whose allocations exceed the effective available power for each power sink. The total effective available power is the difference between the available power, designated Avail_Power, and the minimum allowable remaining power at the instant the power loss alert is received. The minimum allowable remaining power at any instant is designated Min_Rem_Power. Following step 500, after the alarm has been to be an alert of the loss of a power source, in step 510 the alarm processing module 160 determines the number of active power sinks, in order to determine the portion of the total effective available power for each power sink.

In step 520, the quantity P_Val_Global is calculated, representing the effective available power for each power sink. P_Val_Global is calculated as the difference between Avail_Power and Min_Rem_Power, divided by the number of active channels. In the preferred embodiment of the present invention, P_Val_Global is calculated as a floor function, where floor function is defined as for a given x, floor[x] denotes the largest integer n that does not exceed x.

At the execution of step 520, P__Val__Global represents the highest allocation of power given the power sources available at the time the power loss alert is received.

Once P__Val__Global is determined, it is compared against each of the active power sinks to determine if the power drawn by any of the active power sinks exceeds the calculated value P__Val__Global. In this particular embodiment of the present invention, the active channels are kept in a table identifying each power sink and the associated power allocation for each sink. In order to start the comparison, an index variable is initialized in step 530.

In step 540, the index value is used to retrieve the power allocation value for the active power sink indicated by the index value, and a comparison is made of the allocation value for that power sink and the P__Val__Global.

If the P__Val__Global is greater than or equal to the power allocation value for the specific power sink, the power allocation is not updated in the table. The index value is checked in step 560 to see if it is the index value limit, which is equal to the number of power sinks. If the index value being checked is the index value limit, the quantity Avail__Power is updated in step 570 to reflect the reduction in available power due to the loss of a power source. Following step 570, in step 580 the alarm processing module 160 returns processing to PBA module 120. If step 560 determines that the index value is less than the index value limit, then in step 565 the index value n is incremented by one, and the alarm processing module 160 returns to step 540.

Returning to step 540, if the comparison concludes that P__Val__Global is less than that power sink's allocated power, then allocated power for that specific power sink is adjusted to P__Val__Global in step 550.

The alarm processing module 160 returns to step 560 to check whether or not the index value limit has been reached. If the index value limit is reached, the alarm processing module 160 updates Avail__Power in step 570, and returns processing to PBA module 120 in step 580. As before, if step 560 determines that the index value is less than the index value limit, then in step 565 the index value is incremented by one, and the alarm processing module 160 returns to step 540.

Thus, the alarm processing module 160 of the present invention scales back the current power allocation to each oversupplied power sink, in order to keep the total power allocation within limits.

Figure 6:
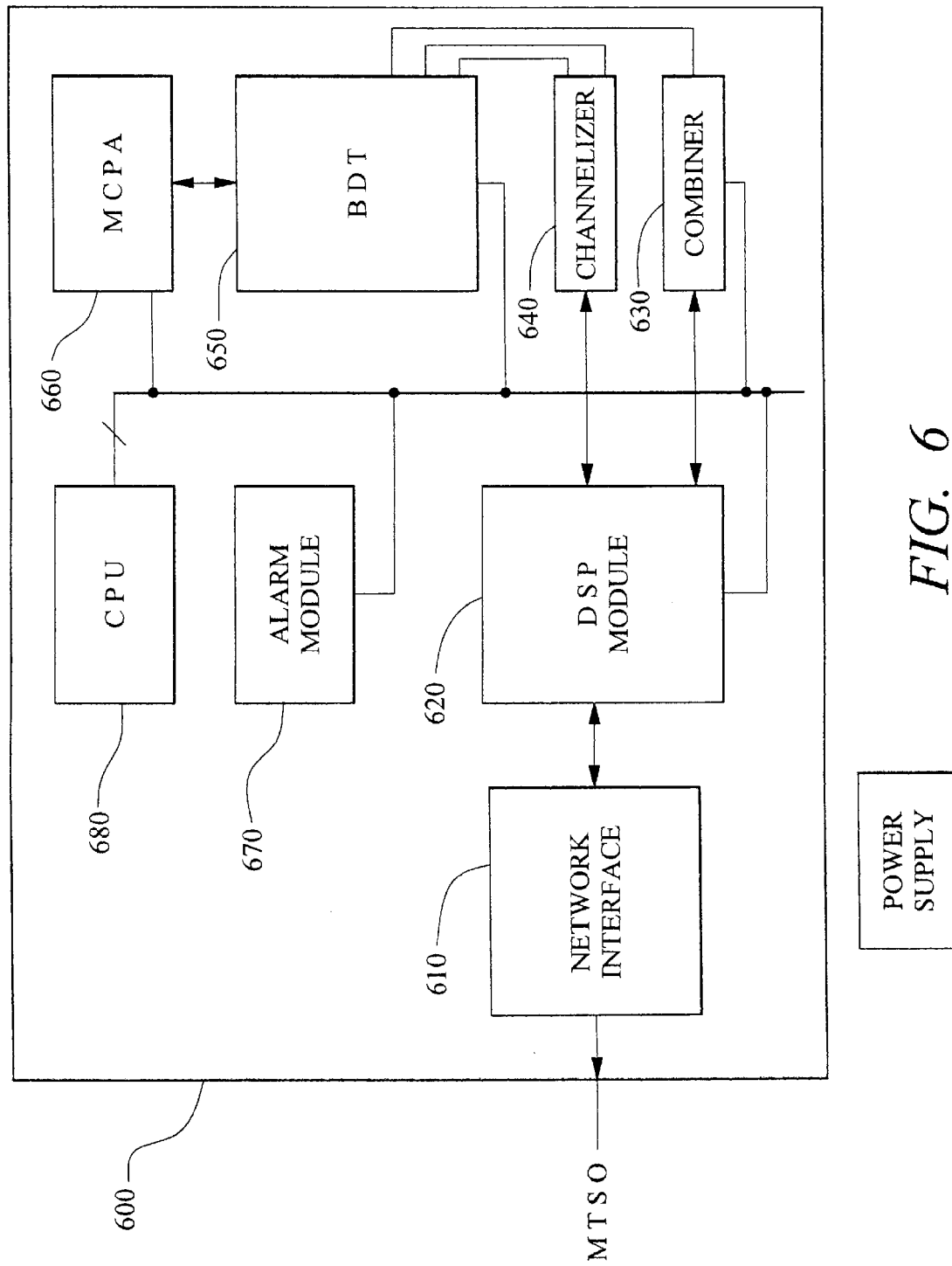
FIG. 6 illustrates a block diagram of baseband transceiver station including a power banking module according to the principles of the present invention.

FIG. 6 illustrates an embodiment of the present invention in a broadband transceiver system (BTS) 600 including a power banking agent according to the principles of the present invention.

In this particular embodiment, the principles of the present invention are being applied to a base station transceiver (BTS) of a cellular communication network. The BTS is part of a time division multiple access (TDMA) system. Each RF carrier of the BTS is divided into eight time slots. Each time slot may carry traffic (voice or data) or control information.

The BTS 600 includes a network interface module 610, digital signal processing (DSP) module 620, a combiner module 630, a channelizer 640, a broadband transceiver (BDT) module 650, a multi-carrier power amplifier (MCPA) 660, an alarm module 670, and a CPU 680.

The network interface module 610 provides for an interface between the BTS 600 and a mobile telecommunications switching office (MTSO) through communication lines (not shown).

The DSP module 620 provides channel coding and modulates channel data from the network interface module 610. The DSP module 620 multiplexes the channel data from the network interface into a single baseband signal for upconversion. The DSP module 620 also provides the equalization, demodulation and channel decoding from received channels of RF carriers that have been downconverted from an intermediate frequency (IF).

The combiner module 630 receives the baseband RF carriers from the DSP module 620. Each RF carrier is filtered and upconverted to a unique IF. This digital IF signal is then transferred to the BDT module 650.

The channelizer module 640 receives a digital composite IF signal from the BDT module 650. The channelizer module 640 filters and downconverts each RF carrier to a baseband signal for processing by the DSP module 620.

The MCPA 660 powers the BDT module 650 and also supplies the power for the broadband carriers. In the preferred embodiment of the present invention, the MCPA 660 may comprise up to four amplifier modules. The actual configuration of the MCPA 660 is dependent on the configuration selected for the BTS 600.

The alarm module 670 monitors the MCPA 660 for fault conditions. The alarm module 670 also functions for the detection and control of devices both internal to and external to the BTS 600. The alarm module 670 may monitor temperature, air flow, security alarms, and other relevant conditions.

The DSP module 620, combiner module 630, channelizer module 640, BDT module 650, the MCPA 660 and the alarm module 670 all interface with the CPU 680. The CPU 680 hosts all of the BTS low-level control, call processing, and operation and maintenance application software. The CPU 680 may be a microprocessor, DSP processor, or microcontroller.

Figure 7:
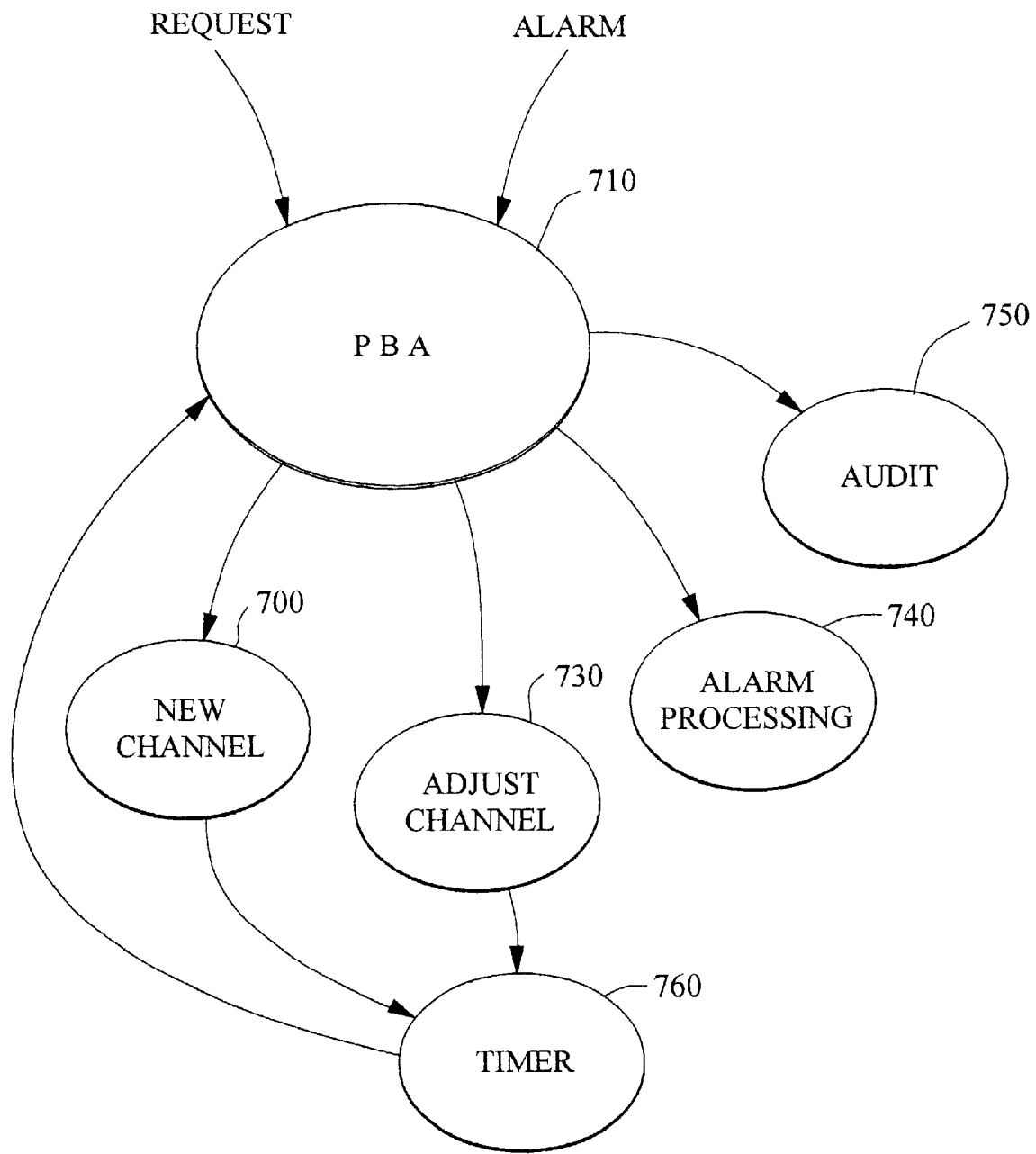
FIG. 7 illustrates a flow diagram of another embodiment of the power banking agent according to the principles of the present invention.

As part of the functioning of the CPU 680 of the BTS 600, the operation and maintenance application software includes a power banking agent which is illustrated in FIG. 7.

FIG. 7 illustrates a flow diagram of another embodiment of the power banking module 700 in the BTS 600 of FIG. 6 according to the principles of the present invention.

The power banking module 700 includes a power banking agent (PBA) 710, a new channel module 720, an adjust channel module 730, an alarm processing module 740, an audit module 750 and a timer module 760.

The PBA 710 initially classifies all incoming requests and/or alarms. The PBA 710 also maintains a data table regarding active channels, allocated power to the active channels, and time slot of the active channel. Further, the PBA 710 maintains information such as minimum remaining power (Min__Rem__Power) of the BTS 600, available power to the new channels (Avail__Power), and related data.

As part of the initialization of the BTS 600, the BTS system software sends to the PBA 710 information about the type and number of operational power modules in the MCPA and the full power designation for a carrier wave.

The PBA 710 maintains the information about the type and number of power modules in a database or data table. Included in this data table are the gross and net power levels associated with each particular type of power module. The net power value is typically lower than the gross power value due to the losses from the output of the MCPA 660 to the transmitting antenna. The data table is flexible enough to be updated frequently and easily changed.

The new channel module 720 determines whether a power sink may be granted power. A new channel request is typically made when there is a request for transmission and/or operation.

The channel adjustment request module 730 reclaims power from or allocates additional power to the channels as requested.

The timer module 760 places requests for power in a queue to be resubmitted later. In this manner, power may be granted to a channel at a later time if the demand for power in that channel or other channels subsequently lessens.

The alarm processing module 740 directs the power banking module 700 to react to an alarm situation such as a MCPA module failure and/or MCPA module addition.

The audit module 750 directs the PBA 710 to periodically check if the active channels are valid. The audit module 750 is entered when the Power_Expiration_Timer, which is set in the PBA 710, expires.

In operation, the PBA 710 receives a channel request. The PBA 710 analyzes the channel request in order to determine the appropriate response. If the received request is a new power request, the PBA 710 forwards the request to the new channel module 720. The new channel module 720 determines if the PBA 710 has the available power and channel resources to satisfy the new power request.

However, if the new channel request cannot be satisfied, the new channel module 720 forwards the request to the timer module 760. The timer module 760 places the new power request on a queue. After the time in the queue has elapsed, the timer module 760 resubmits the new channel request back to the PBA 710 for processing in the same manner described.

If the PBA 710 determines that the request is for a channel adjustment, the PBA 710 forwards the adjust channel request to the adjust channel module 730. An adjust channel request may come from a channel requesting additional power and/or from a channel requesting a power reduction.

If a power adjustment request is requesting additional power which cannot be satisfied immediately, the PBA 710 forwards the adjust channel request to the timer module 760. The timer module 760 places the adjust channel request on a queue. After the time in the queue has elapsed, the adjust channel module 730 resubmits the adjust channel request to the PBA 710.

If the PBA 710 determines that the request is an alarm reflecting a change in power source such as a MCPA module failure or the installation of a new MCPA module, the PBA 710 forwards the alarm to the alarm processing module 740. If the alarm indicates the addition of a power supply, the value Avail_Power is changed to reflect the increase in available power. If the alarm is a MCPA module failure, the alarm processing module 740 checks the active channels and if necessary adjusts the active channels such that all active channels are operating within the available power resources.

Figure 8:
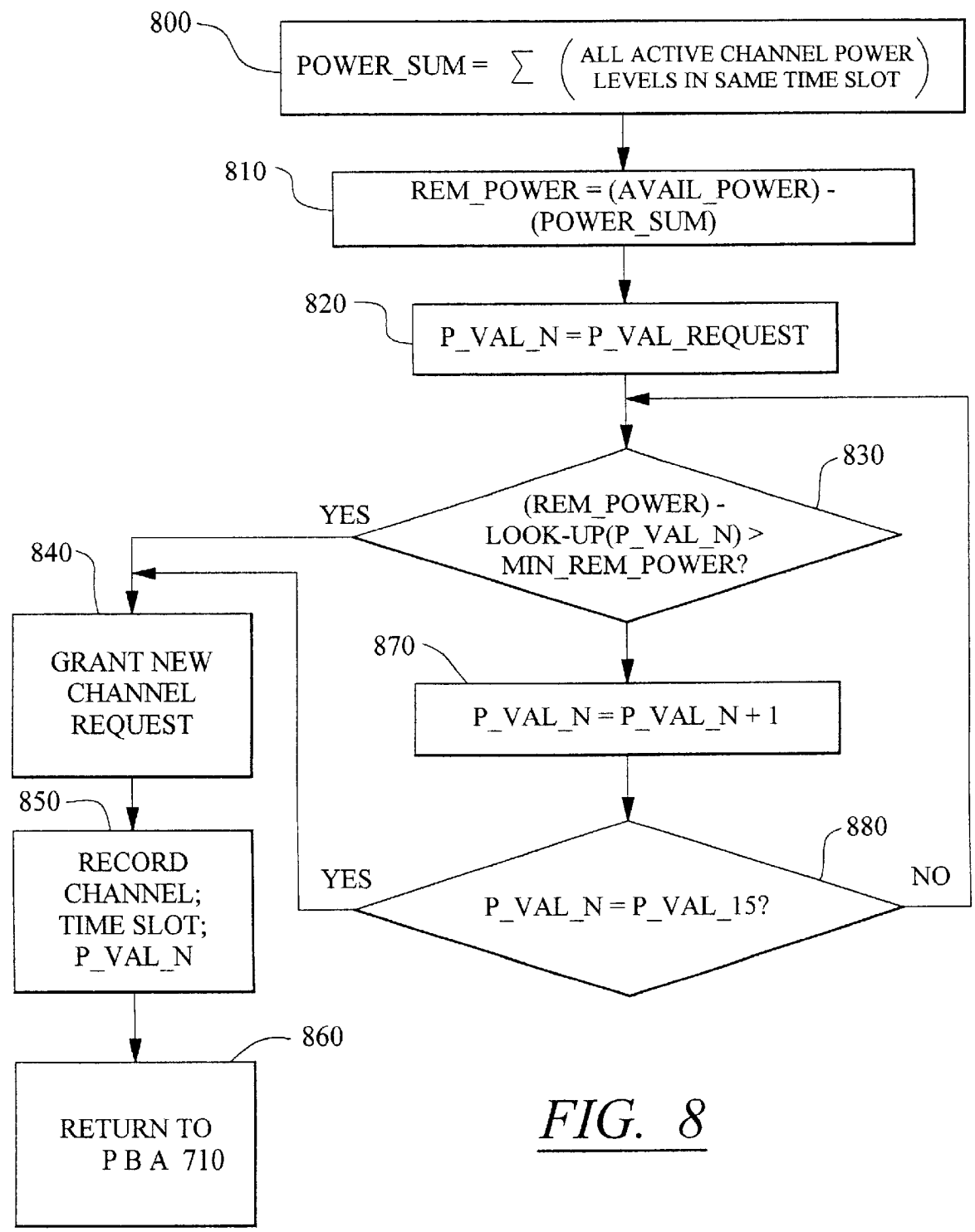
FIG. 8 is a flow diagram of the new channel module of the embodiment of the power banking module shown in FIG. 7.

FIG. 8 is a flow diagram of the new channel request module 720 of the embodiment of the power banking module shown in FIG. 7.

As a request is forwarded to the PBA 710, and subsequently the PBA 710 determines that the request is for a new channel and at a request power level, P_Val_Request, the PBA 710 forwards the request to the new channel request module 720.

In step 800, a value Power_Sum is determined from all active channel power levels in the same time slot. Power_Sum is defined as the sum of all active power requirements for a particular time slot. Since the BTS 600 of the current embodiment is a TDMA system, every time slot is occupied by a different channel. Furthermore, the BTS 600 is a multi-carrier BTS which it allows to carry multiple channels per time slot. In order to track the power required for each channel per time slot, the PBA 710 maintains in the data table the number of channels in use and a corresponding power value, P_Val, for each of the channels. The power requirement for each of the time slots is determined by totaling the power required by each active channel per time slot from the data table.

In step 810 the quantity remaining power, designated Rem_Power, is calculated by subtracting the value Power_Sum from Avail_Power. The Rem_Power indicates the amount of surplus power available to fulfill any power requests.

Subsequently, step 820 sets the value of P_Val_n at P_Val_Request. P_Val_n will be used in the new channel request module 720 to track the power level that can be granted, as the new channel request module 720 evaluates system resources to determine the maximum allowable power level that can be granted in response to a new channel request. In the variable P_Val_n, n is used as a reference in a lookup data table to obtain power values for a particular channel. Specifically, n refers to the number of 2dB increments below full scale power that P_Val_n represents, for a particular channel. The values used in P_Val_n may also be user defined, so that they are not initially dependent on the calculated value of n.

Step 830 determines whether the allocation of an individual channel power request will reduce the remaining power below the minimum remaining power threshold, designated Min_Rem_Power. First, a table look-up of the value requested power, P_Val_n is used to determine a power value. The resulting power value is then subtracted from Rem_Power, and this result is compared to Min_Remaining_Power. If the comparison concludes that the power remaining after granting the new channel request will not fall below the minimum threshold, then step 840 grants the new channel request.

After granting the new channel request, in step 825 the data table is updated with the data reflecting Channel Number and Time Slot, and the new channel is granted the requested amount of power, P_Val_n.

Subsequently, in step 860, the new channel request module 720 returns processing to PBA 710.

Returning to step 830, if the comparison result concludes that the granting of an individual channel power request will reduce the remaining power level below the minimum remaining power threshold Min_Remaining_Power, then a check is made to see if a lesser amount than the requested amount, P_Val_n, can be granted.

In step 870, P_Val_n is reset to equal P_Val_n+1, representing a power level 2 dB below the original P_Val_n, in accordance with the description of the variable n above.

In step 880, the New Channel Request Module 720 determines whether the current value of P_Val_n represents the minimum per-channel power level P_Val_15. In the preferred embodiment of the present invention, the minimum per-channel power level P_Val_15 will always be granted, since P_Val_15 represents such a low power level that there is no threat of saturation if it is granted. If the comparison of step 880 concludes that P_Val_n equals P_Val_15, then processing is forwarded to step 840, and the new channel request is granted. The relevant data is recorded in step 850, and in step 860 processing is returned to the Power Banking Agent 710.

If step 880 concludes that the current power value requested, P_Val_n, does not equal the minimum per-channel power value P_Val_15, then processing repeats step 830, to determine whether granting the reset value P_Val_n will cause the remaining power level to fall below the minimum remaining power threshold Min_Remaining_Power.

Thus the new channel request module 720 of the present invention will grant each new channel request, at the requested level, the maximum available power level, or at the minimum level, before returning processing to the Power Banking Agent 710.

Figure 9:
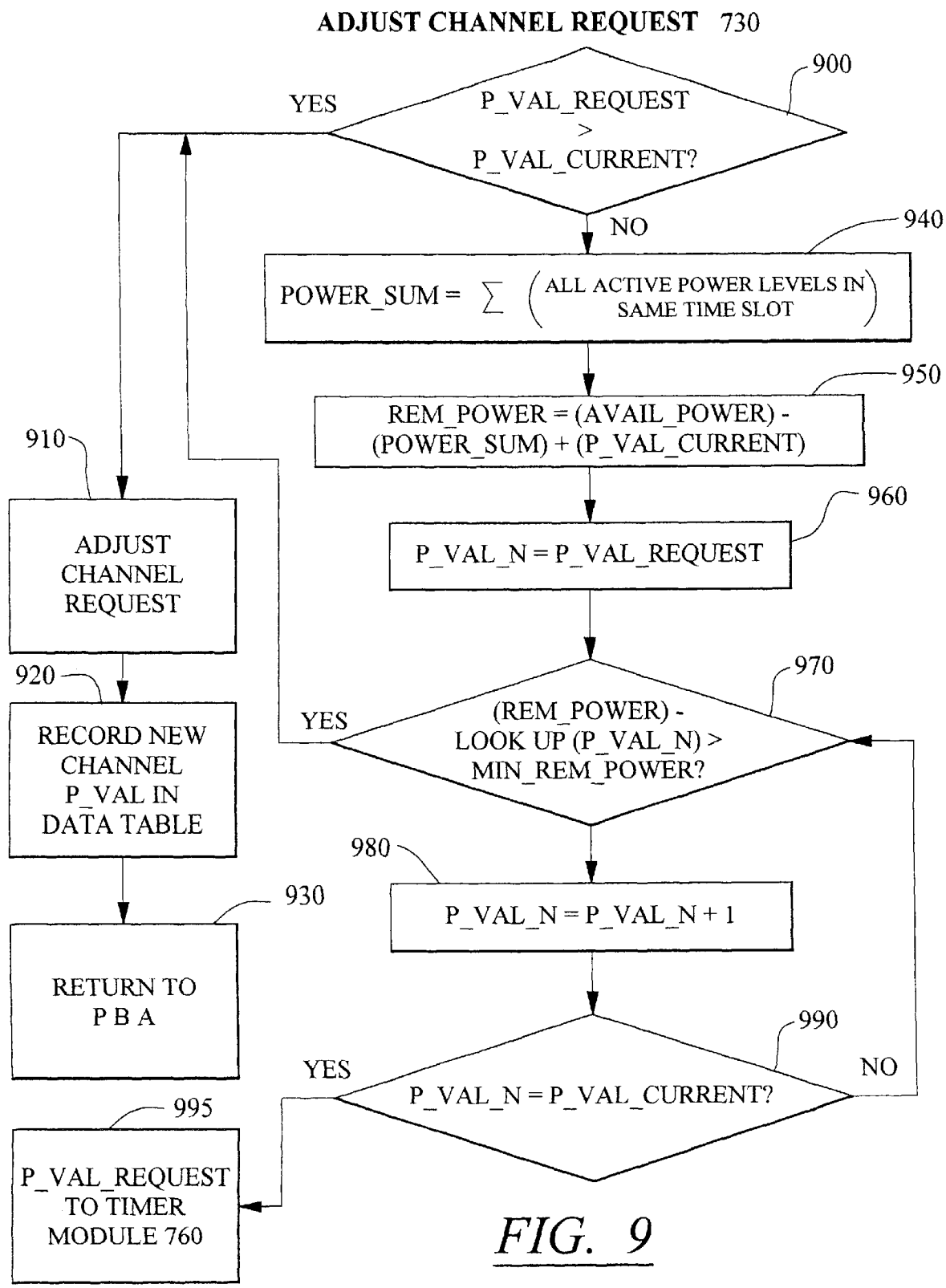
FIG. 9 is a flow diagram of the adjust channel module of the embodiment of the power banking module shown in FIG. 7.

FIG. 9 is a flow diagram of the adjust channel module 730 of the embodiment of the power banking module shown in FIG. 7.

If the PBA 710 determines that the channel request with a specific P_Val_Request and channel number is a channel adjustment request, the channel adjustment request is forwarded to the adjust channel module 730.

In step 900, the P_Val_Request is compared against the current value of power for the requested channel, P_Val_Current. If the P_Val_Request is greater than the current value (meaning less power), the adjust channel module 730 grants the power level adjustment in step 910.

After granting the power level adjustment, in step 920 the data table maintained by the PBA 710 is updated to reflect the new value for power by substituting the granted P_Val for the power value of the requested channel. Subsequently, in step 930, processing is returned to the Power Banking Agent 710.

Returning to step 900, if the quantity P_Val_Request is less than P_Val_Current for the requested channel (indicating more power), the adjust channel module 730 determines if the PBA 710 has the available power resources to satisfy the request.

Step 940 performs a summation of the power levels of all active channels in the same time slot. This summation is designated Power_Sum.

Step 950 determines a value for the remaining power Rem_Power, which is defined as the available power (Avail_Power) minus the quantity Power_Sum plus the current value of power P_Val_Current for the requested channel. This value is designated as Rem_Power.

In step 960, P_Val_n is defined as the requested power value, P_Val_Request. As in other modules, the variable n refers to the number of 2dB increments below full scale power that P_Val_n represents, for a particular channel. The values used in P_Val_n may also be user defined, so that they are not initially dependent on the calculated value of n.

In step 970, the quantity (Rem_Power minus LookUp (P_Val_n)) is compared against Min_Rem_Power. This comparison is made to check whether or not there are sufficient power resources to satisfy the channel adjustment request P_Val_n. If the comparison is favorable, i.e., if the quantity (Rem_Power minus LookUp(P_Val_n))>Min_Rem_Power, then the adjust channel module 730 sends the channel adjust request to step 910, where the request is granted.

If the step 970 comparison concludes that the quantity (Rem_Power minus LookUp(P_Val_n))<Min_Rem_Power, the adjust channel module 730 checks whether or not the request may be satisfied with a lesser amount. To accomplish this, in step 980 P_Val_n is incremented to equal P_Val_n+1, thereby reducing the power represented by P_Val_n by 2dB from the received value.

Step 990 inquires whether the incremented P_Val_n equals the current power value P_Val_Current of the channel requesting a power level adjustment. If the query in step 990 concludes that the new P_Val_n equals P_Val_Current, then adjustment isn't necessary to achieve the incremented P_Val_n. Accordingly, step 995 sends the original P_Val_Request to timer module 760 for where it is place on a queue for resubmission at the expiration of the timer period.

If the comparison in step 990 concludes that P_Val_n does not equal P_Val_Current, then processing returns to step 970 to check whether or not there are sufficient power resources to satisfy the channel adjustment request at the new P_Val_n. Thus by repeating steps 970-990, the channel adjustment request module 730 repeats as necessary processing the channel adjustment request until either the highest available power level or the current power level is granted.

Figure 10:
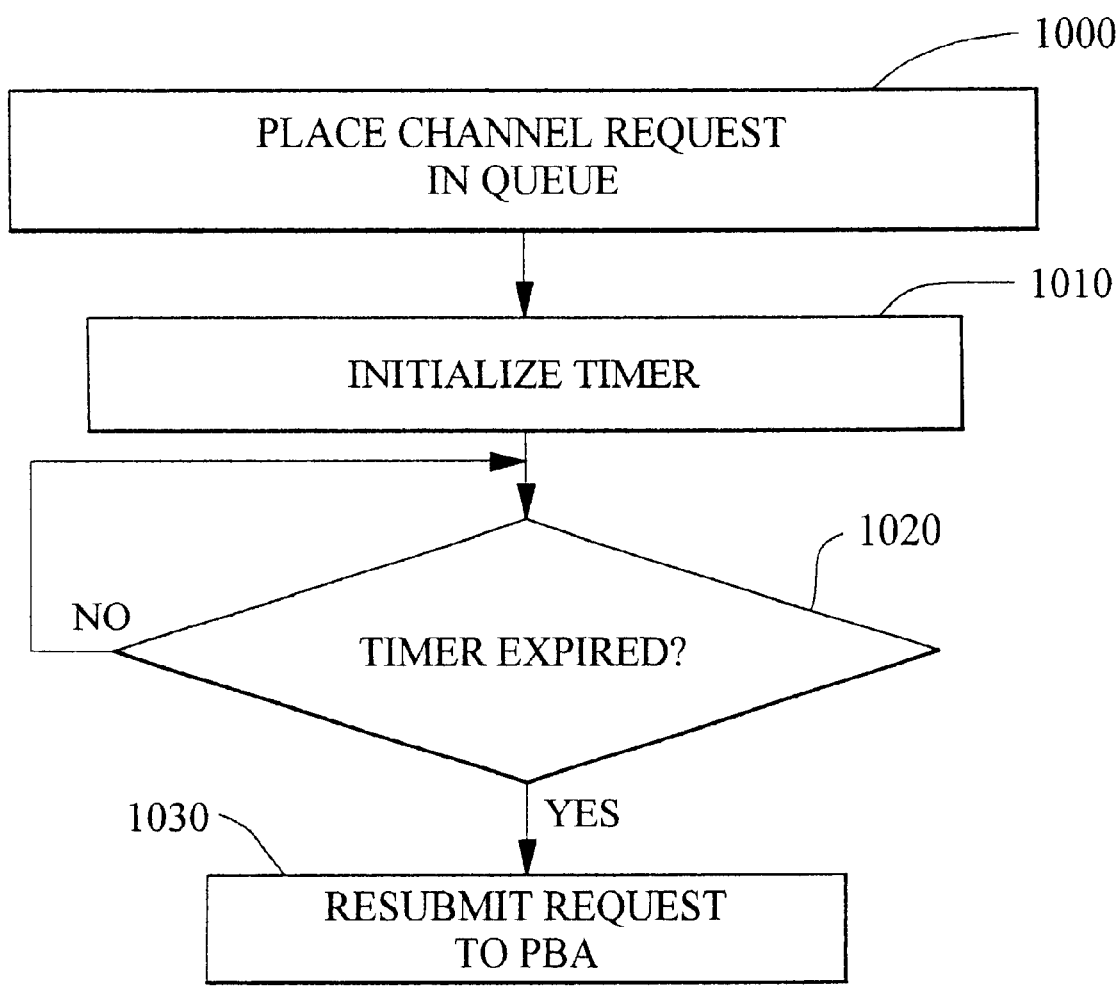
FIG. 10 is a flow diagram of the timer module of the embodiment of the power banking module shown in FIG. 7.

FIG. 10 is a flow diagram of the timer module 760 of the embodiment of the power banking module shown in FIG. 7.

If a request cannot be initially satisfied by any of the other modules of the Power Banking Agent of the present invention, the request is forwarded to the timer module 760.

In step 1000, the submitted request is placed in a queue.

In step 1010, a timer for the submitted request is initiated.

The timer is checked for expiration in step 1020. If the timer has not expired, the timer module 760 returns to step 1020.

If the timer has expired in step 1020, the timer module executes step 1030, which sends the submitted request to the PBA 710 for further processing.

Figure 11:
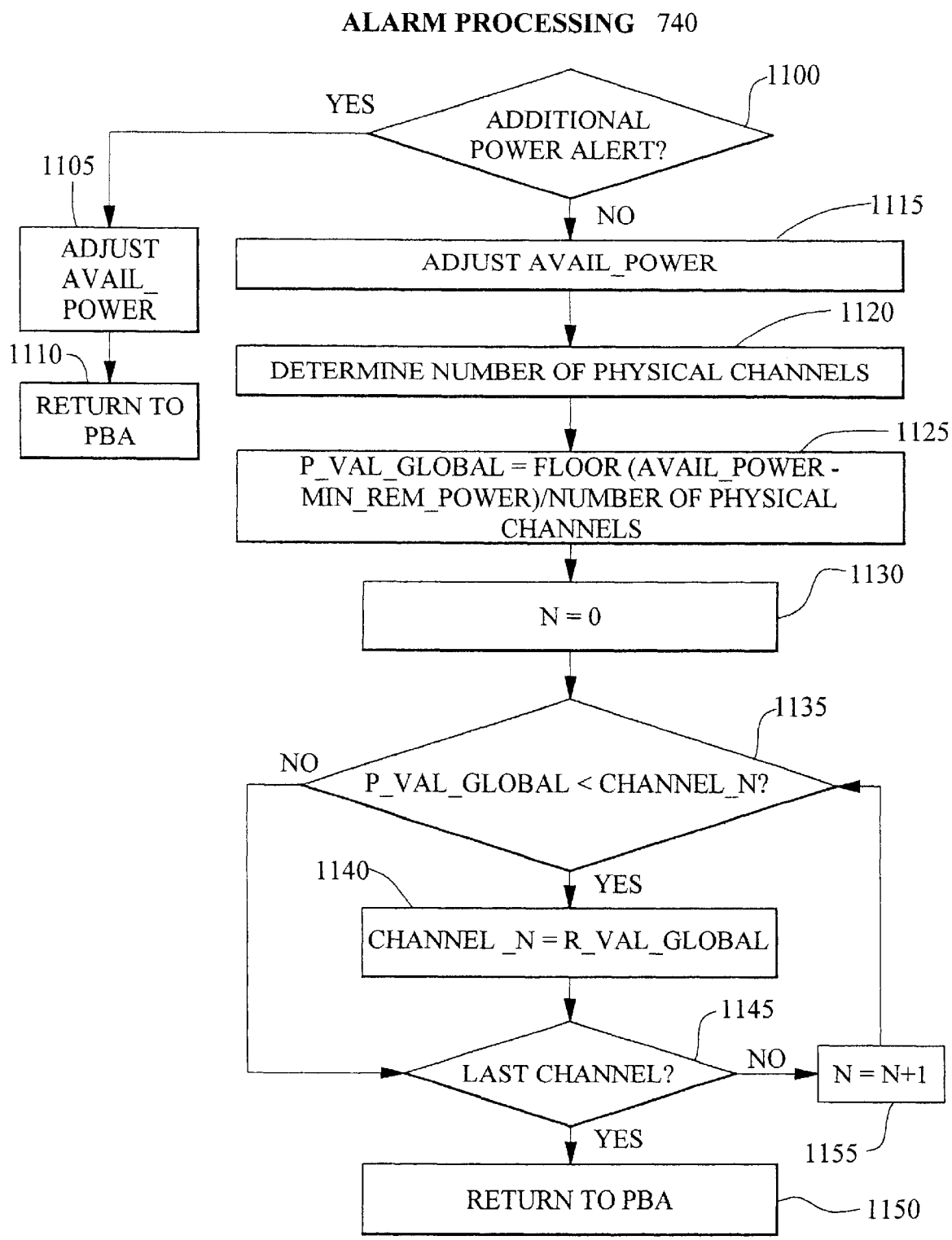
FIG. 11 is a flow diagram of the alarm processing module of the embodiment of the power banking module shown in FIG. 7.

FIG. 11 is a flow diagram of the alarm processing module 740 of the embodiment of the power banking module shown in FIG. 7.

On occasion, the PBA 710 will receive an alarm concerning a MCPA module failure and/or a MCPA module addition. In these events, the PBA forwards the alarm to the alarm processing module 740.

In step 1100, the alarm processing module 740 determines the type of alarm it has received. If the alarm is a MCPA module addition alarm, in step 1105 the alarm processing module 740 modifies the value Avail_Power to account for the additional power.

In step 1110, the alarm processing module 740 returns to the PBA 710.

Returning to step 1100, if the alarm is a MCPA module failure, the alarm processing module 740 must determine whether any of the active channels are drawing more power than is available to that channel. In order to check whether an active channel is drawing more power, in step 1115 the alarm processing module 740 reduces the value Avail_Power by the amount of power lost due to the MCPA module failure.

The alarm processing module 740 determines the number of active channels in step 1120.

Step 1125 calculates a power value representing the maximum amount of power for each channel given the reduced amount of power. This value is designated as P_Val_Global. P_Val_Global is defined as the lowest integer value of the result of dividing the quantity (Avail_Power minus Min_Rem_Power) by the number of physical channels.

In step 1130, an index variable, n, is initialized. The index variable is used to track the number of active channels maintained by the data table.

In step 1135, P_Val_Global is compared against the power value of the indexed channel.

If the P_Val_Global is lower than the power value of the indexed channel, in step 1140 P_Val_Global is substituted for the current value of power for the indexed channel.

Step 1145, determines whether the current channel is the last active channel. If it is the last active channel, the alarm processing module 740 ends processing and returns to the PBA 710.

If from step 1145, the current channel is not the last channel, the index variable, n, is incremented by one in step 1155. The alarm processing module 740 then returns to step 1135.

Returning to step 1135, if the value P_Val_Global is higher than the power value of the indexed channel, the alarm processing module 740 moves to step 1145.

Figure 12:
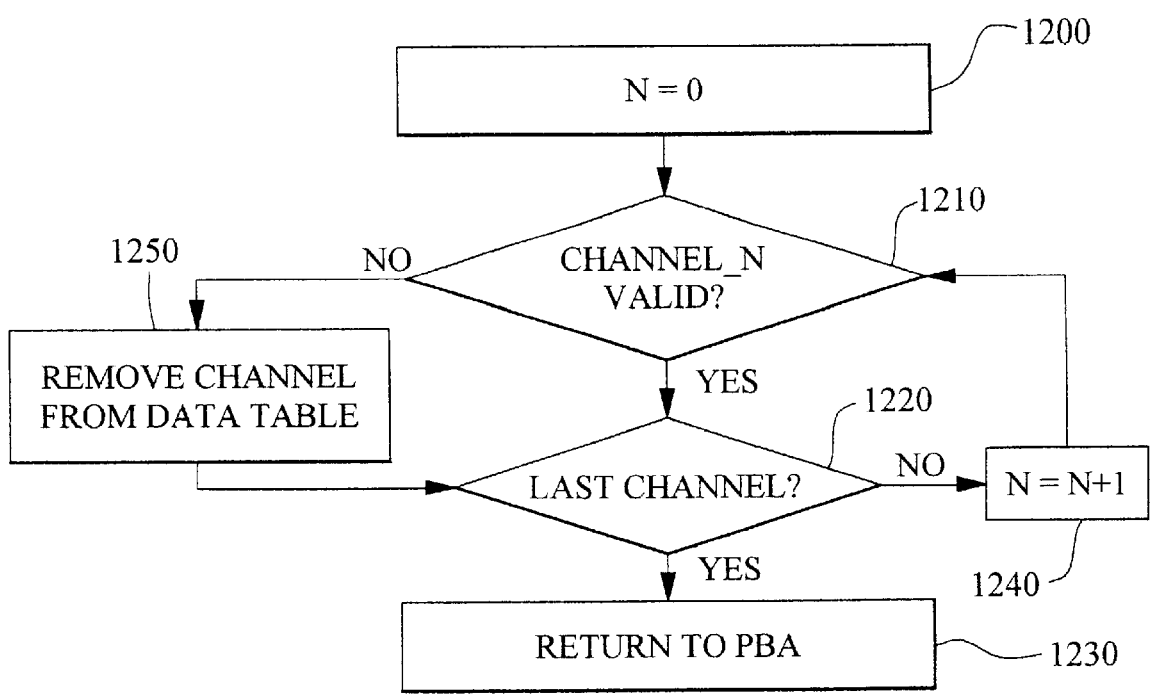
FIG. 12 is a flow diagram of the power audit module of the embodiment of the power banking module shown in FIG. 7.
Figure 13:
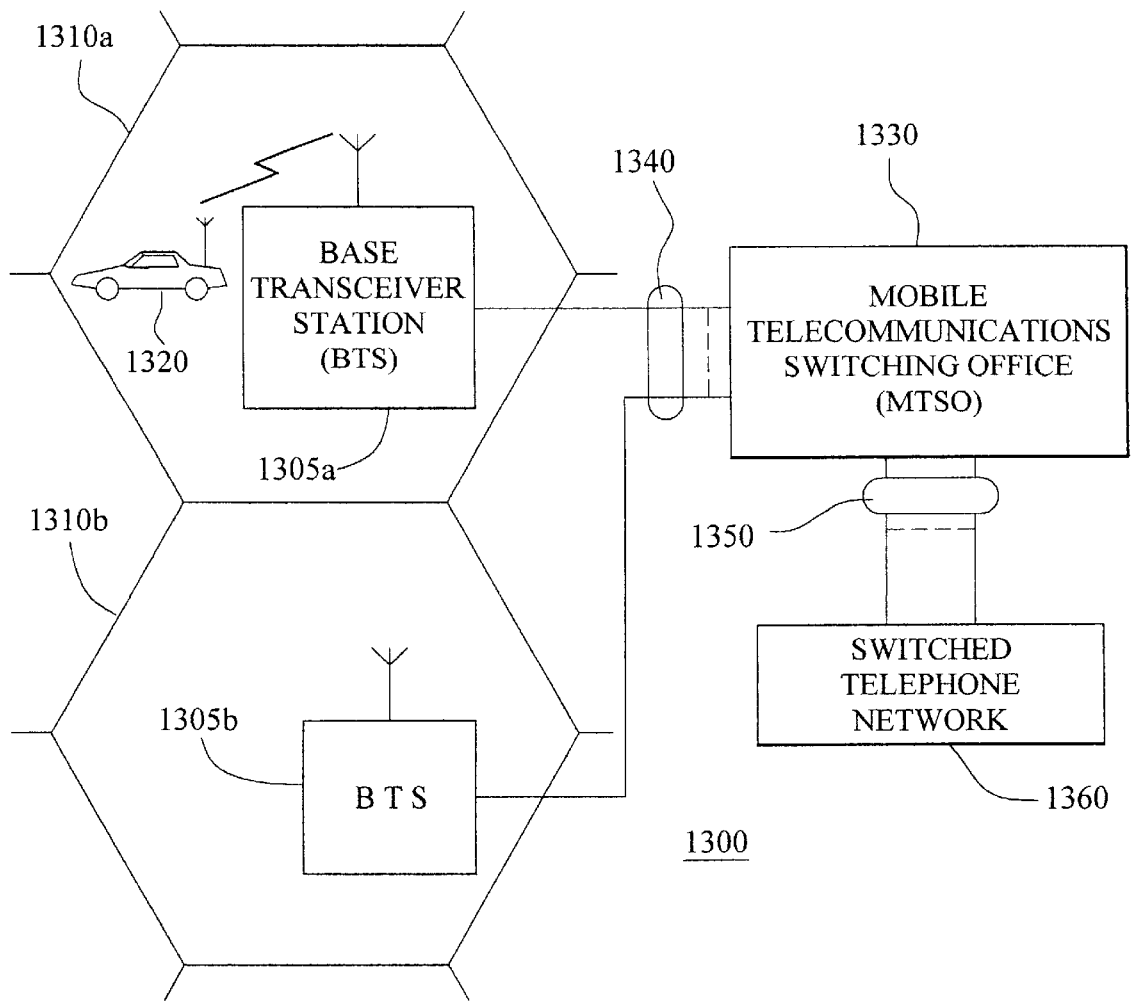
FIG. 13 illustrates a conventional cellular phone system.

FIG. 12 is a flow diagram of the power audit module 750 of the embodiment of the power banking module shown in FIG. 7.

The PBA 710 maintains a timer to check periodically if the requested channels are active. If the requested channels are not active, the channels are removed from the data table. This timer helps assure that power is reclaimed from unused channels. At the expiration of this timer, Power_Expiration_Timer, the PBA 710 moves to the power audit module 750.

In step 1200, an index variable, n, is initialized. The index variable, n, is used to index the channels in the data table.

In step 1210, a channel is retrieved that is indexed by the current value of n. The indexed channel is checked to determine if the channel is still valid.

If the channel is valid, step 1220 determines if the indexed channel is the last channel.

If the indexed channel is the last channel, the power audit module 750 ends and the control is returned to PBA 710.

Returning to step 1220, if the channel is not the last channel, the index variable, n, is incremented by one in step 1240. The alarm processing module then returns to step 1210 for further processing.

Returning to step 1210, if the channel was not valid, the channel is removed from the data table in step 1250.

As described above, according to the broadband power management (power banking) method and apparatus within a broadband multi-carrier base station transceiver system of the present invention, power is continuously allocated dynamically to each channel. Changes in conditions of input power and output channels are compensated, and the power banking method and apparatus of the present invention provides maximum available output to each channel, while preventing strain or overload of the system amplifiers.

While the invention has been described with reference to the exemplary embodiments thereof, those skilled in the art will be able to make various modifications to the described embodiments of the invention without departing from the true spirit and scope of the invention.

What is claimed is:

1. In a broadband transceiver system (BTS) including a multi-carrier common radio frequency power source, a method for allocating power among channels comprising:
   receiving a request for a channel wherein said request includes a requested power value;
   determining a remaining power value from an available power value provided by said common radio frequency power source minus a summation of power levels in all active channels;
   comparing said remaining power value minus said requested power value with a minimum remaining power value; and
   allocating at least a minimum amount of power to said channel if it is determined that said remaining power value minus said requested power value is greater than said minimum remaining power value.

2. The method for allocating power among channels in a BTS of claim 1, further comprising:
   comparing said requested power value with said allocated power; and
   forwarding said request to a timer module if said comparing determines that said requested power value is greater than said allocated power.

3. The method for allocating power among channels in a BTS of claim 2, further comprising:
   returning said request from said timer module after an expiration of a timer.

4. The method for allocating power among channels in a BTS of claim 1, further comprising:
   determining if said remaining power value minus said requested power value is less than said minimum remaining power value; and
   checking again said remaining power value minus a reduced requested power value.

5. The method for allocating power among channels in a BTS of claim 4, wherein said reduced requested power value is determined by reducing said requested power level by an indexed amount, said indexed amount being a multiple of a minimum power value.

6. The method for allocating power among channels in a BTS of claim 1, further comprising the step of allocating said requested power value if it is determined that said remaining power value minus said requested power value is greater than said minimum remaining power.

7. The method for allocating power among channels in a BTS of claim 1, further comprising the step of distinguishing between a new power request and a power adjustment request.

8. In a broadband transceiver system (BTS) including a multi-carrier common radio frequency power source, an apparatus for allocating power among channels comprising:
   means for receiving a request for a channel wherein said request includes a requested power value;
   means for determining a remaining power value from an available power provided by said common radio frequency source minus a summation of power levels in all active channels;
   means for comparing said remaining power value minus said requested power value with a minimum remaining power value; and
   means for allocating at least a minimum amount of power to said requesting channel if it is determined that said remaining power value minus said requested power value is greater than said minimum remaining power value.

9. The apparatus for allocating power among channels in a BTS of claim 8, further comprising:
   means for comparing said requested power value with said allocated power; and
   means for forwarding said request to a timer module if said comparing means determines that said requested power value is greater than said allocated power.

10. The apparatus for allocating power among channels in a BTS of claim 9, further comprising:
    means for returning said request from said timer module after an expiration of a timer.

11. The apparatus for allocating power among channels in a BTS of claim 8, further comprising:

means for determining if said remaining power value minus said requested power value is less than said minimum remaining power value; and means for checking again said remaining power value minus a reduced requested power value, wherein said requested power value is reduced.

12. The apparatus for allocating power among channels in a BTS of claim 11, wherein said reduced requested power value is reduced by an indexed amount.

13. The apparatus for allocating power among channels in a BTS of claim 8, further comprising a means for distinguishing between a new power request and a power adjustment request.

14. A method for managing power among channels in a broadband transceiver system (BTS) including a multi-carrier common radio frequency power source, said method comprising:

receiving a request for a channel wherein said request includes a requested power value;

comparing said requested power value with a current power value for said channel; and allocating said requested power value to said requesting channel if it is determined that said requested power value is less than said current power value.

15. The method for managing power among channels in a BTS of claim 14, further comprising:

determining a remaining power value from an available power value provided by said common radio frequency power source minus a summation of all active channel power levels in a same time slot plus said current power value;

determining if said remaining power value minus said requested power value is greater than a minimum remaining power value; and sending said request to a timer module it is determined that said remaining power value minus said requested power value is greater than said minimum power value.

16. The method for managing power among channels in a BTS of claim 15, further comprising, allocating said requested power value to said requesting channel if said remaining power value minus said requested power is greater than said minimum remaining power value.

17. The method for managing power among channels in a BTS of claim 14, further comprising recording said requested power value as an updated current power value if it is determined that said requested power value is less than said current power value.

18. The method for managing power among channels in a BTS of claim 14, further comprising:

reducing said requested power if it is determined that said remaining power value minus said requested power value is less than said minimum remaining power value; and checking again said remaining power value minus a reduced requested power level with said minimum remaining power value.

19. The method for managing power among channels in a BTS of claim 18, wherein said reduced requested power value is said requested power level reduced by an indexed amount.

* * * * *